June 11, 1940.   R. J. COWLING   2,204,474
ART OF FORMING, REFRIGERATING, AND HARVESTING FROZEN BODIES
Filed Oct. 29, 1932   2 Sheets-Sheet 1

INVENTOR
Richard J. Cowling
BY
ATTORNEY

June 11, 1940.   R. J. COWLING   2,204,474
ART OF FORMING, REFRIGERATING, AND HARVESTING FROZEN BODIES
Filed Oct. 29, 1932   2 Sheets-Sheet 2
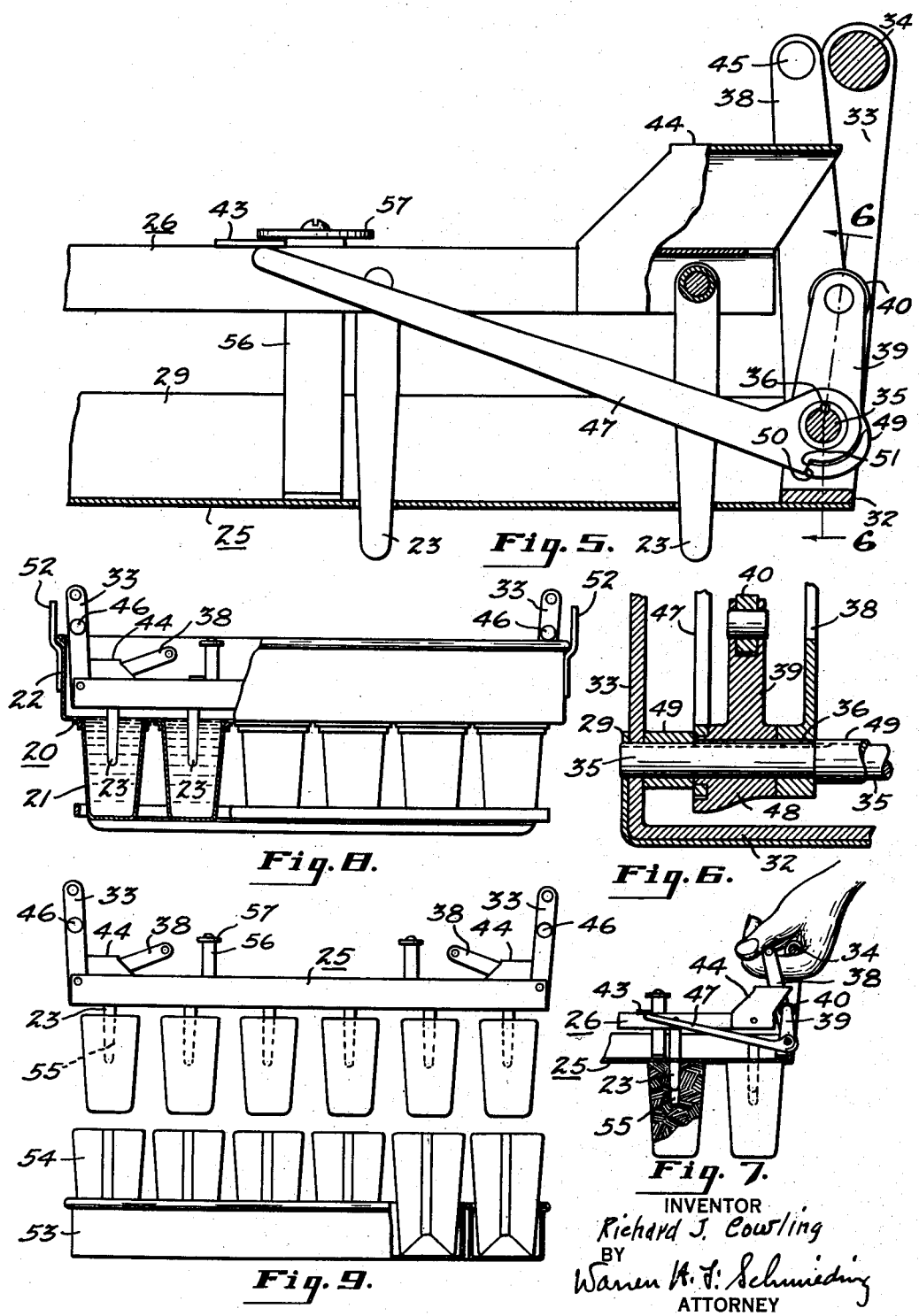
INVENTOR
Richard J. Cowling
BY
Warren H. F. Schmieding
ATTORNEY Patented June 11, 1940

2,204,474

UNITED STATES PATENT OFFICE

2,204,474

ART OF FORMING, REFRIGERATING, AND HARVESTING FROZEN BODIES

Richard J. Cowling, Cleveland, Ohio

Application October 29, 1932, Serial No. 640,217

22 Claims. (Cl. 107—8)

The present invention relates to the art of forming, refrigerating and harvesting frozen bodies such as frozen edible novelties.

One of the objects of the present invention is to provide improved mechanism for forming and harvesting frozen confections having a small hole adapted to receive a handle stick by which stick the confection can be held while it is being eaten.

Another object of the invention is to remove the frozen confection from the mold in which it is formed by a peg or rod, which peg or rod is frozen to the confection during the freezing of the confection, and then to remove the peg or rod from the frozen confection; the hole in the confection which is formed by the peg or rod may be utilized for receiving a handle stick.

A still further object is to utilize the peg as a means for holding or manipulating the frozen confection when a coating is applied thereto.

Other and further objects and advantages will be apparent from the following disclosure, reference being had to the accompanying drawings wherein a preferred form of embodiment of the present invention is clearly shown.

In the drawings:

Fig. 5 is a view similar to Fig. 4 showing certain parts in a different position;

Fig. 6 is a sectional view taken on line 6—6 of Fig. 5;

Fig. 7 is a sectional view similar to Fig. 5 and showing the mode of operating the mechanism;

Fig. 8 shows the assembly in position in a mold, part of the mold structure being shown in section; and Fig. 9 shows the assembly carrying frozen confections attached thereto and in position for dropping the frozen confection in wrappers.

Figure 1:
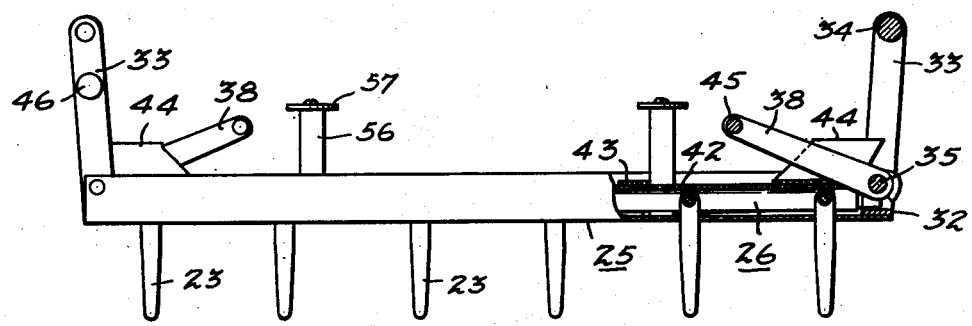
Fig. 1 is a side view of the assembly of the peg and grid structures, part thereof being shown in section.
Figure 2:
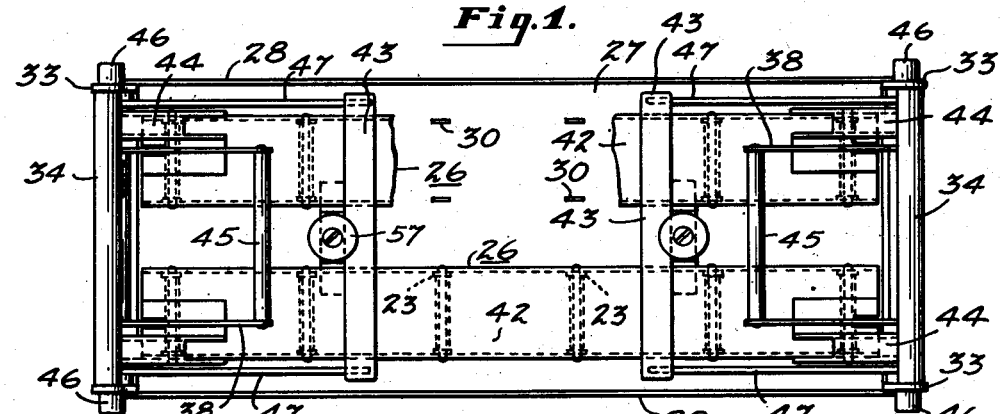
Fig. 2 is the top plan view of the assembly shown in Fig. 1.
Figure 3:
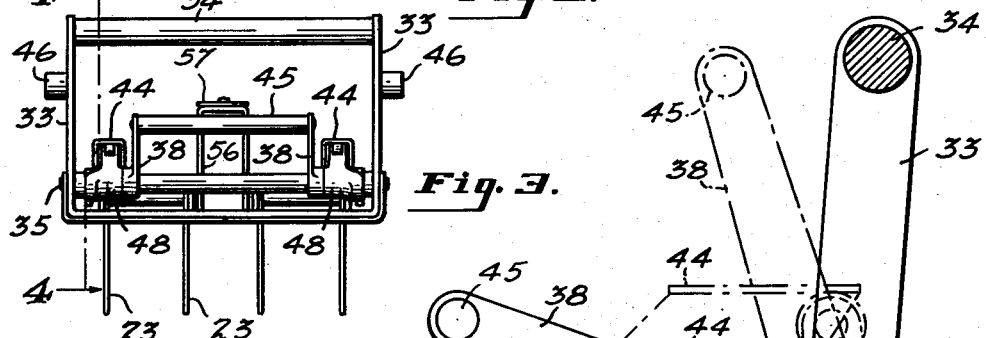
Fig. 3 is an end view of this assembly.

Referring to the drawings in general, there is provided a mold structure 20, which in the present instance comprises twenty four separate molds 21 and which depend from a receiving chamber 22. Material to be frozen is placed in these molds and the entire structure is then subjected to a freezing temperature; for example the mold may be partly immersed in brine so as to provide an even temperature on all sides of the molds.

After the material is frozen, it is desirable to remove the same from the mold and in some instances it is desirable to apply a coating to this frozen material and then pack the same in bags or wrappers, or the like. In accordance with the present invention I have provided a facile mechanism for removing the frozen confection from the mold and for applying a coating thereto. A peg or spur is inserted in each mold and the confection in the molds are frozen to the spurs. After the bond has been broken between the confection and the mold, the pegs are withdrawn carrying with them the frozen confections. If desirable a coating may then be applied to the frozen confections and then the bond between the pegs and the frozen confections is broken whereby the frozen confection can fall or be removed from the spurs. If desirable the frozen confections may be dropped directly into a bag or, if desirable, a handle stick can be inserted in the holes formed by the spurs and then the frozen confections may be placed in bags or wrappers.

Referring more in detail to the drawings; there is shown a grid structure 25, and a peg structure 26. The grid structure, or grid, includes a flat plate 27 having side walls 28 and 29. In the present instance the plate 27 is provided with four rows of slots 30, each row including six slots. A frame 32 is carried at each end of the plate and each includes oppositely disposed uprights 33, which at their upper ends carry a handle 34. A shaft 35 is journaled in each of the frames and is provided with key slots to receive keys 36. Handles in the form of levers 38, and cams in the form of levers 39, are keyed to the shafts 35 by the keys 36. The outer ends of the levers 39 each carry a roller 40. Movement of the levers 38 will cause a movement to be imparted to the cams 39.

Figure 4:
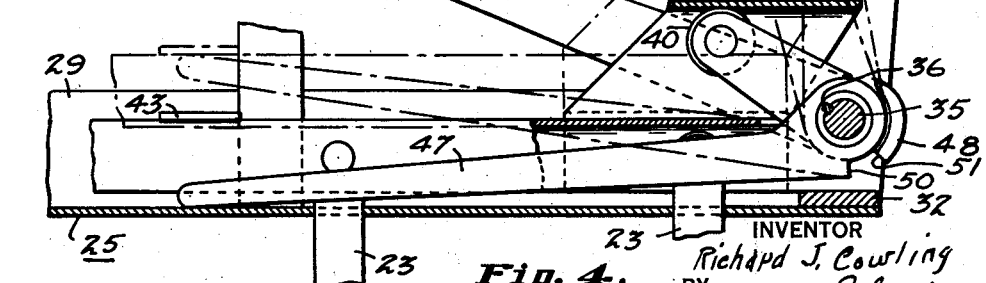
Fig. 4 is a sectional view taken on line 4—4 of Fig. 3.

The peg structure includes two longitudinally extending inverted channel irons 42, placed side by side and connected with one another by cross strips 43 and these channel irons carry the spurs 45 23. Each channel iron carries twelve spurs and the twenty four spurs extend through the twenty four openings or slots 30 in the plate 27 of the grid structure 25. It will be noted that the slots 30 are of such width that their sides engage the sides of the rods or spurs 23 rather closely. Thus, as the rods or spurs 23 are withdrawn through the slots 30, the sides thereof serve as scrapers for removing any adhering part or parts of the confection material that may tend to adhere to the rods or spurs 23. Inverted U shaped members 44, are attached at opposite sides and opposite ends of the spur structure and receive the cams 39 which are attached to the shaft 36. The upper wall of these U shaped members is arranged to be engaged by the rollers 40, carried by the cams 39. Referring particularly to Fig. 4, the spur structure is shown in its lowermost position. By rotating the handle 38 in a clockwise direction, it will be noted that the roller 40 will engage the top wall of the U shaped members 44 causing the spur structure to be cammed upwardly. A bar 45 connects each pair of levers 38 and forms a handle. The arrangement is such that the operator may grasp one bar 45, and one bar 34 in one hand and then by closing the hand, the bars will be moved toward one another.

It will be noted that when the bars 45 are manipulated, the spurs 23 will be pulled upwardly through the slots 30, and the confections which are frozen to the spurs will be brought into engagement with the under side of the plate 27. Then by further squeezing operation of the hands, the spurs 23 will be pulled out of the confection and the confection will fall away from the spurs.

Studs 46 are carried by uprights 33 and are arrange to rest upon the top of chamber 22 and thereby provide for spacing the grid and spur assembly a short distance above the molds 21 so that no liquid will come in contact with the plate 27 and freeze thereto. Very little energy therefore need be expended in raising the confection from its lowest position to the bottom of the plate 27. Often the confection is frozen very firmly to the rods or spurs and considerable force must be applied to break the bond between the spurs and the confection. Accordingly, I have arranged the cam 39 so that it will impart a relatively great upward movement to the spur structure, for a given movement of the lever 38, at the beginning of the upward movement. This relatively great movement is imparted only to the extent of moving the confection into engagement with the lower side of the plate 27. At this point the cam 39 is approaching its extreme vertical position in which a large relative movement is imparted to the lever 38 while only a small upward movement is imparted to the spur structure. In this manner considerable force can be applied by the handle 38 at the time it is desirable to break the bond between the spurs and the confection. After the bond is once broken, only a small amount of energy need be expended in raising the spurs to a higher position and I have arranged for a relatively great upward movement of the spur structure by a relatively small movement of the handle 38 after the bond is broken. To accomplish this I have provided a long lever 47 which is loosely mounted upon the hub 48 of cam 39. Spacing sleeves 49 are disposed between the levers 47 and uprights 33. Each lever is provided with a shoulder 50 which is arranged to be engaged by a shoulder 51 on the hub 48 and these shoulders are so positioned that they will not engage one another until the spur structure has been raised high enough to break the bond between the spurs and the confection. The ends of the levers 47 are arranged to engage the under side of the tie bars 43 for lifting the spur structure upwardly. Thus it will be seen that by this mechanism there is exerted, first; a relatively large upward movement of the spur structure for a given movement of the handle 38 whereby to move the frozen confection into engagement with the under side of the plate 27; then a relatively small upward movement is exerted to the spur structure for a like movement of the handle 38 in order to supply considerable force for breaking the bond between the spurs and the confection and then a greater upward movement is exerted to the spur structure by the lever 47 after the bond is broken. It will be appreciated that the extent of movement of the lever 38 is limited by the limited grasp of one's hands and by my mechanism I have provided for raising the spur structure the necessary distance and have provided for the greatest force when such force is necessary.

A post 56 carrying an abutment 57 lies in the path of movement of strips 43 to limit the upward movement of the peg structure to prevent the pegs from being withdrawn from the slots in grid plate 27.

In the use of this device, the spur assembly may be inserted in position at any time prior to the solidification of the frozen confection. Preferably the assembly is inserted before the mold is inserted into the brine tank. Handles 52 are provided at opposite ends of the mold for manipulating the same and after the confection is frozen the mold is withdrawn from the brine tank. The bond between the confection and the individual molds 21 is then broken in a suitable manner, as for example by dipping the molds in warm water to cause a slight melting of the outside of the confection. The handles 34 are then used to withdraw the spur assembly from the mold structure 20 and since the confection is frozen to the spurs 23, they will then be withdrawn with the spur assembly. If it is desirable to coat the frozen confection, as for example with chocolate, this coating may be applied while the confections are frozen to the peg as by dipping the confections in a bath of warm chocolate. The chocolate coating will be quickly solidified by imparting the heat thereof to the confection and then the confection can be removed from the spurs. If desirable a rack, such as that shown at 53 may be provided which carries a suitable number of bags 54 which receive the frozen confections when they are released from the spurs. Also if desirable, handle sticks may be inserted into the holes 55 formed by the spurs 23.

It will be apparent from the foregoing description that I have provided a facile method of forming and harvesting frozen confections and this can be carried out without the hands of the operator coming in contact with the confection.

While the form of mechanism herein shown and described constitutes a preferred embodiment of my invention, it is to be understood that other forms may be adopted all coming within the scope of the following claims.

What I claim is as follows:

1. In a refrigerating device, peg means for supporting a confection frozen thereto, a handle for said means, means adapted to engage the confection for breaking the bond between the peg means and confection, a handle for the second means, said handles being disposed adjacent one another for grasping both with one hand and adapted when grasped to move said first and second means away from one another for causing the engagement of the confection and second means.

2. In a refrigerating device, peg means including a plurality of pegs each for supporting a confection frozen thereto, handles for said peg means disposed at opposite ends thereof, a grid structure having openings for receiving the pegs and adapted to engage the confection for breaking the bond between the pegs and confection, handles for the structure disposed at opposite ends thereof, the handle at either end of the grid structure being disposed adjacent the handle of the peg means for grasping both with one hand and adapted when grasped to move said peg means and grid structure away from one another for causing the engagement of the grid structure and confection.

3. In a refrigerating device, a grid structure having means for carrying the same and having openings, and a peg structure slidably mounted on said grid structure, said peg structure including a plurality of pegs extending through said openings for carrying confections frozen to the lower ends thereof, said structures being moveable relative to one another for removing the confections from the lower ends of said pegs.

4. In a refrigerating device, a horizontally disposed grid structure having means for carrying the same, a peg structure slidably mounted and carried by the grid structure and including a plurality of pegs extending downwardly a predetermined distance below and through the grid structure, and means for moving the peg and grid structure relative to one another for withdrawing the pegs through said grid structure.

5. In a refrigerating device, a grid structure having openings, a peg structure including a plurality of pegs extending through said openings for carrying confection frozen to the lower ends thereof, means for moving said structures away from one another for causing the pegs to be withdrawn through the openings of the grid structure to break the bond between the pegs and confection, mechanism for imparting a relatively great movement of the means for a given movement of the mechanism at the beginning of the movement of said structures away from one another and for thereafter decreasing the ratio of movement of said means with respect to said mechanism.

6. In a refrigerating device, a grid structure having openings, a peg structure including a plurality of pegs extending through said openings and carrying confections frozen thereto, means for moving said structures away from one another for causing the pegs to be withdrawn through the openings of the grid structure to break the bond between the pegs and confection, mechanism for imparting a relatively great movement of the means for a given movement of the mechanism at the beginning of the movement of said structures away from one another and for thereafter decreasing the ratio of movement of said means with respect to said mechanism during a further movement of said structures away from one another and for thereafter increasing the ratio of movement of said means with respect to said mechanism.

7. A confection making apparatus comprising a mold having a plurality of mold cavities for the reception of the confection material and means for removing the material from the mold cavities, said means consisting of a portable carrier adapted to be supported above said mold cavities, rods depending from said carrier and spaced thereon so that a rod is engageable in each mold cavity when the carrier is supported thereabove, said carrier being removable from said mold cavities with the confection congealed on the rods, and stripper means slidably mounted on said rods for simultaneously stripping said confections from said rods when the carrier is removed from the mold cavities.

8. A confection making apparatus comprising, in combination, a mold having a plurality of spaced cavities for the reception of the confection material and a portable carrier for removing the material when frozen from the mold, said carrier having means for supporting the same in spaced relation to the tops of said cavities, said carrier having rods depending therefrom and spaced thereon so that a rod is engageable in each mold cavity when the carrier is supported thereabove, said carrier being removable from said mold with the confections congealed on the rods, and stripper means slidably mounted on said rods for simultaneously stripping said confections from said rods when the carrier is removed from the mold cavities.

9. A confection making apparatus comprising, in combination, a mold having an upstanding mold pan and a plurality of spaced cavities depending from the bottom thereof for reception of confection material to be frozen, and a portable carrier for removing the material when frozen from said mold, said carrier having handles at opposite ends thereof for manipulating the same, means mounted on said handles for supporting the carrier on the upstanding sides of the mold pan in spaced relation to the open-tops of said cavities, said carrier having a plurality of spaced rods depending therefrom so that a rod is engageable in each mold cavity when the carrier is supported thereabove, said carrier being removable from said mold with the confections congealed on the rods, said carrier having means for simultaneously stripping the confections from said rods when the same is removed from the mold.

10. A portable carrier of the character described comprising a horizontal base plate having a horizontal spur supporting member slidably mounted thereon, a plurality of spaced apertures in said base plate, a plurality of similarly spaced spurs mounted on said spur supporting member, said spurs projecting through said apertures, means interposed between said plates for moving them relative to each other to vary the distance to which said spurs project through said base plate.

11. A portable device of the character described, comprising in combination a mold structure having a plurality of mold cavities, a spur supporting member adapted to be supported thereby, a plurality of spurs mounted in spaced relationship on said spur supporting member, each spur adapted to be inserted into a separate mass to be solidified in said mold cavities, and means slidably mounted on said spur supporting member for stripping each mass when solidified from its respective spur when removed from the mold structure, said means including means for scraping faces of each spur to remove the solidified mass from said spur without substantial alteration of said solidified mass.

12. A portable apparatus of the character described, comprising a pair of superimposed slidably mounted plates, the lower plate having a plurality of spaced slots therein and the upper plate having a plurality of similarly spaced rods depending therefrom and adapted to extend through said slots a predetermined distance therebelow, and means interposed between said plates for causing relative motion therebetween to vary the distance said rods project through said lower plate.

13. Apparatus of the character described which comprises a portable carrier consisting of a pair of superimposed plates, the lower plate having a plurality of spaced slots therein and the upper plate having a plurality of similarly spaced rods depending therefrom and extending through the slots a predetermined distance below the lower plate, means interposed between said plates for vertically separating said plates to vary the distance said rods project through the lower plate, and means for preventing said plates from being moved sufficiently far apart to permit withdrawal of the rods from the slots in said lower plate.

14. Apparatus of the character described consisting of a portable carrier comprising a pair of superimposed horizontal members, the lower member having a plurality of spaced slots therein and the upper member having a plurality of similarly spaced rods depending therefrom and adapted to project through said slots a predetermined distance therebelow, separating means disposed between said plates adjacent opposite ends of said carrier for causing relative movement between said members to vary the distance which the rods project through said slots, and means for limiting the movement between said members to prevent complete withdrawal of said rods from said slots.

15. Apparatus of the character described consisting of a portable carrier comprising a pair of superimposed horizontal members, the lower member having a plurality of spaced slots therein and the upper member having a plurality of similarly spaced rods depending therefrom and adapted to project through said slots a predetermined distance therebelow, spaced means interposed between said members for causing relative movement therebetween to vary the distance which the rods project through said slots, and means for limiting the movement between said members to prevent complete withdrawal of said rods from said slots.

16. Apparatus of the character described consisting of a portable carrier having handles at opposite ends thereof for facilitating manipulation of the same, a pair of superimposed horizontal members, the lower member having a plurality of spaced slots therein and the upper member having a plurality of similarly spaced rods depending therefrom and adapted to project through said slots a predetermined distance therebelow, a pair of spaced cams interposed between said members for causing relative movement therebetween to vary the distance to which said rods project through said slots, each of said cams being actuated independently of the other by a lever extending above said upper member at opposite ends thereof and adjacent the handles of said carrier whereby said levers may be grasped by the hands of the operator while holding the carrier by its handles.

17. Apparatus of the character described comprising a lower plate member having a plurality of spaced slots therein and being provided with handles at opposite ends thereof, an upper plate member having a plurality of similarly spaced spurs depending therefrom and adapted to project through said slots of the lower plate member, a bell-crank member having one end thereof interposed between said plate members and the other end extending upwardly above said plate members and opposite said handles for causing relative movement between said plate members to vary the distance to which said spurs project through said lower plate member.

18. Apparatus of the character described comprising a lower plate member having a plurality of spaced slots therein and being provided with handles at opposite ends thereof, an upper plate member having a plurality of similarly spaced spurs depending therefrom and adapted to project through through said slots of the lower plate member, a pair of spaced bell-crank members having one arm thereof interposed between said plate members and the other arm extending upwardly above said plate members and opposite ends thereof adjacent the handles of the lower plate member for causing relative movement between said plate members to vary the distance to which said spurs project through said lower plate member.

19. A portable carrier of the character described which comprises a pair of superimposed supporting members one of which has fixed handles at opposite ends thereof, a plurality of spaced apertures in one of said supporting members, a plurality of spaced spurs depending from the other of said supporting members, the spurs of the one member projecting through the apertures of the other member, and pivotal actuating means mounted on one of said members and adapted to bear against the other of said members to cause an increase of separation between said members.

20. A portable carrier of the character described which comprises an apertured stripping member having spaced fixed handles projecting upwardly from opposite ends thereof, a spur supporting member adapted to be superimposed on said stripping member, a plurality of spaced spurs depending from said supporting member, said spurs projecting through said apertures in said stripping member, and pivotally mounted actuating means mounted on one of said members adapted to bear against the other member to increase the separation between said members, said means having actuating handles extending upwardly in juxtaposition to the handles of said stripping member whereby the actuating handle may be grasped by the fingers of the operator's hands while holding the fixed handles in the palms thereof.

21. A confection making apparatus comprising a mold structure having a plurality of mold cavities for the reception of confection material to be solidified in combination with a portable carrier for removing the material from the mold cavities, said carrier consisting of a group of spurs arranged in spaced relation corresponding to the spacing of the mold cavities in the mold structure so that one spur is immersible in the confection material contained therein, a stripper member slidably mounted on said spurs, said stripper member adapted to contact the solidified confections adhering to said spurs, and means for moving said group of spurs and said stripper member relative to each other for stripping said confections from said spurs when the carrier is removed from the mold structure.

22. A confection making apparatus comprising a mold structure having a plurality of mold cavities for the reception of confection material to be solidified in combination with a portable device comprising a base plate and a depending spur supporting member slidably mounted on said base plate, said base plate having a plurality of apertures arranged in spaced relation corresponding to the spacing of the mold cavities in the mold structure, the depending spurs on said spur supporting member being arranged so that one each projects through an aperture in said base plate and into the confection material to be frozen in said mold cavities, said spur supporting member being slidable with respect to said base plate to vary the distance to which said spurs project therethrough for stripping the solidified confections therefrom when the carrier is removed from the mold structure, each aperture in said base plate being of such a contour that a pair of opposed edges thereof relatively closely confines a pair of opposed faces of its respective spur at least over a length of said spur between a position of relative full projection and a position of partial projection.

RICHARD J. COWLING.